Oct. 8, 1957     C. K. MOREHOUSE ET AL     2,809,225
PRIMARY CELL
Filed April 21, 1954     2 Sheets-Sheet 1
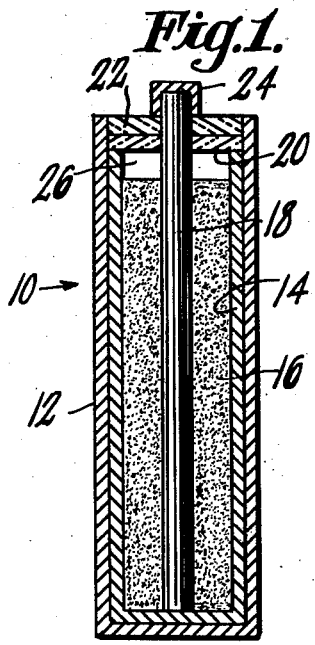
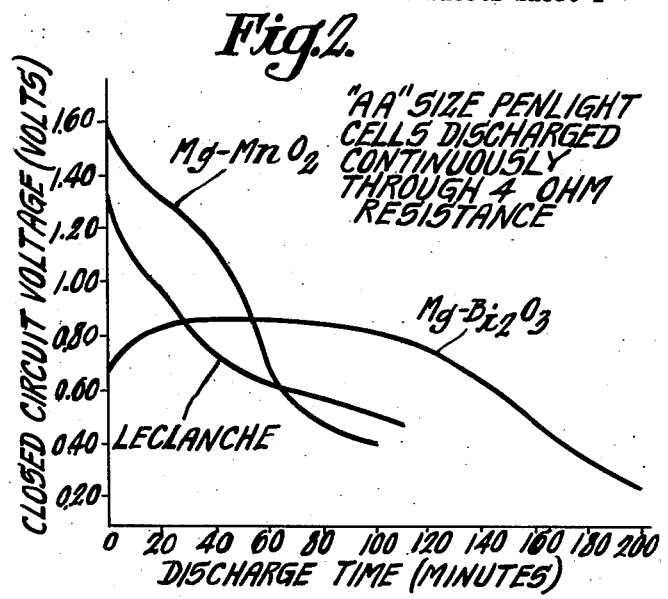
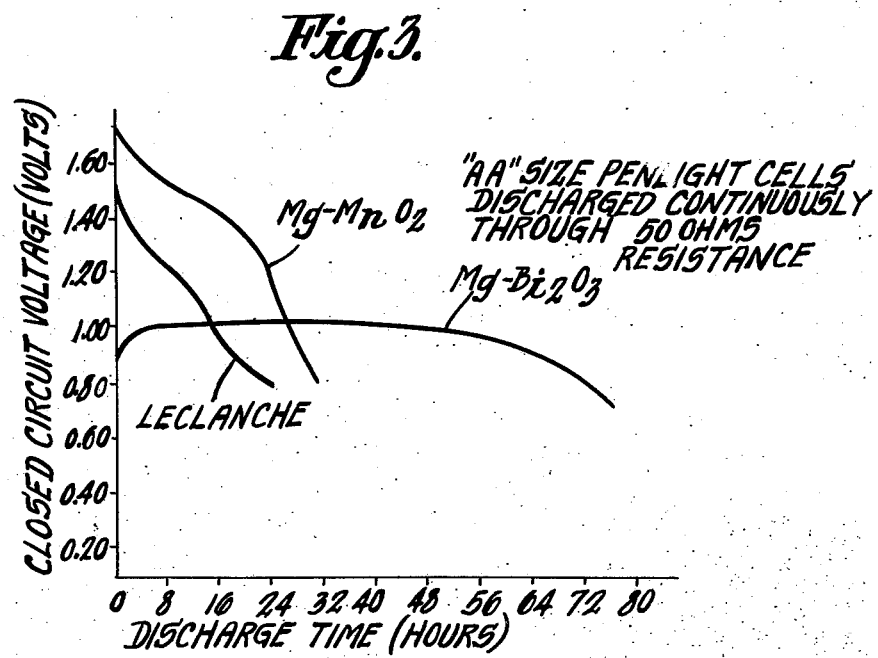
INVENTORS
CLARENCE K. MOREHOUSE
RICHARD GLICKSMAN
BY J. C. Whittaker
ATTORNEY

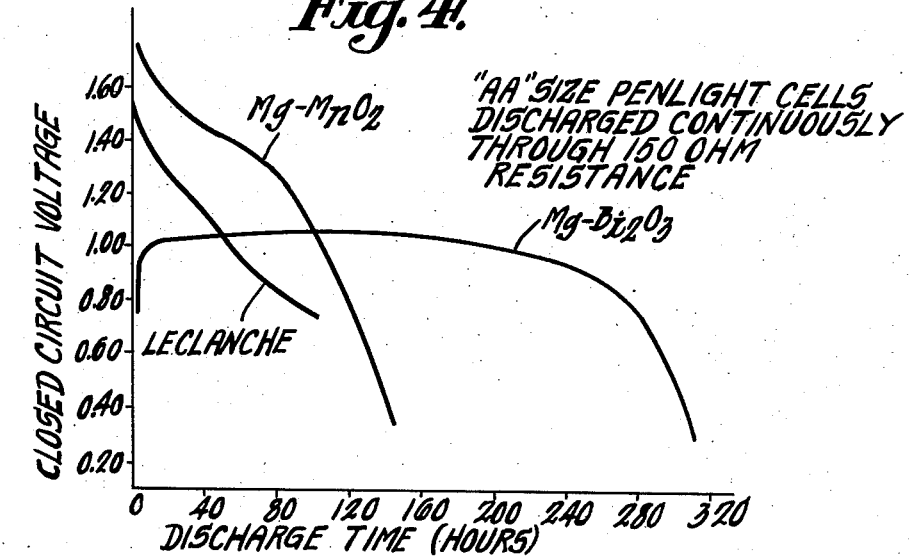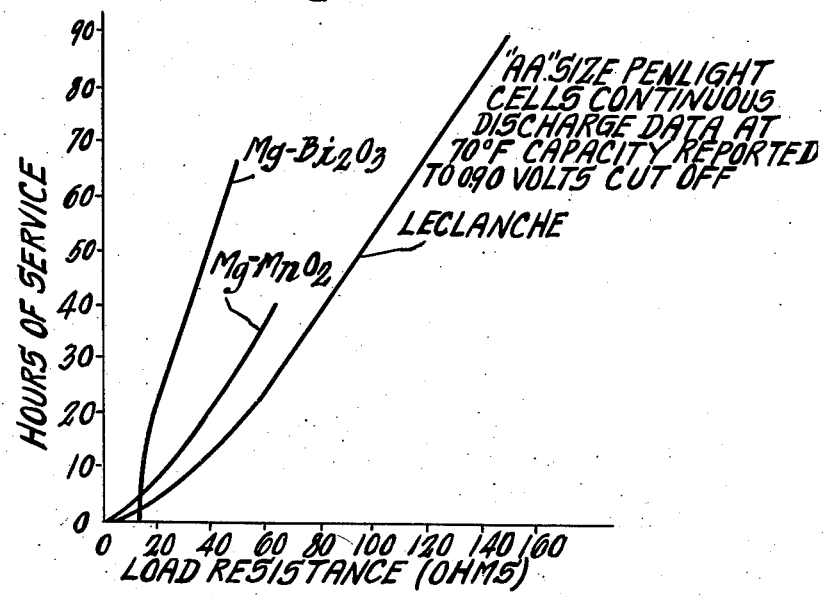

United States Patent Office 2,809,225
Patented Oct. 8, 1957

2,809,225
PRIMARY CELL

Clarence K. Morehouse, Princeton, and Richard Glicksman, Highland Park, N. J., assignors to Radio Corporation of America, a corporation of Delaware Application April 21, 1954, Serial No. 424,579

7 Claims. (Cl. 136—83)

This invention relates generally to primary cells. Particularly, the invention relates to an improved electrochemical primary electric current producing cell consisting of a novel electrochemical system for the generation and storage of electrical energy.

An electrochemical cell of the type described herein is suitable for use as a portable power supply from which chemical energy is converted to electrical energy by means of an electrochemical process. It is desirable that these power supplies have the following characteristics: they should be portable and dry, i. e., contain a non-spillable electrolyte; they should have high watt-hour capacity per unit of volume and weight; they should have a high, flat operating voltage level for a wide range of current drains; they should have long life; and they should be low in cost.

Present day primary electrochemical cells do not completely embody all of the foregoing characteristics. For example, a type of cell, presently in commercial use, which provides comparatively high capacity and a high flat operating voltage characteristic at high current drain is comparatively expensive to manufacture.

A further problem in some present day cells resides in the fact that they include materials which come into short supply either because they become critical to the interests of the nation as a whole or for some other economic reason.

Accordingly, an object of this invention is to provide an improved primary cell which is comparatively inexpensive to manufacture and which has a high watt-hour capacity per unit volume of weight and a high flat operating voltage level for a wide range of current drains.

A further object of the invention is to provide an improved primary electric cell including materials which tend to be readily available in large quantities.

In general, the foregoing and other objects and features of the invention are accomplished in a novel cell which includes a cathode of one or more compounds of bismuth in combination with a metal anode and an electrolyte comprising an ionically conducting medium.

The invention is described in greater detail by reference to the drawings wherein:

Fig. 1 is a sectional, elevational view of a typical primary cell embodying the principles of the invention;

Fig. 2 is a first set of curves showing the change in cell voltage with respect to discharge time of cells of the present invention compared with some comparable existing cells of equal size when discharged continuously through a 4 ohm resistance;

Fig. 3 is a second set of curves showing the change in cell voltage with respect to discharge time of cells of the present invention compared with some comparable existing cells of the same size when discharged continuously through a 50 ohm resistance;

Fig. 4 is a third set of curves showing the change in cell voltage with respect to discharge time of cells of the present invention compared with some comparable existing cells of the same size when discharged through a resistance of 150 ohms;

Fig. 5 is a fourth set of curves showing the capacity in hours of service to a 0.90 volt end point per cell when cells of the present invention and some comparable existing cells are discharged at varying current drains.

EXAMPLE I

The anode

Referring to the drawing, one example of a dry-type primary cell 10 employing the electrochemical system of the invention includes a metallic anode 12 in the form of a cup which comprises magnesium or an alloy of magnesium, for example, a Dow Chemical Company alloy AZ31A which is a magnesium base alloy containing 3% aluminum, 1% zinc, 0.2% manganese, 0.15% calcium, and 95.65% magnesium. The anode cup is lined with a separator 14 for separating the anode and cathode of the cell from each other and for providing a low resistance path for the flow of ions in the electrolyte. An absorbent kraft paper or an absorbent kraft paper coated with a gel-like material such as carboxyl methyl cellulose or polyvinyl alcohol or such a paper coated with suitable starch-flour gels may be employed for the separator 14. The coating on the kraft paper promotes adhesion of the paper to the anode and maintenance of good contact between the cell electrolyte and the anode. The cathode 16 of the cell is deposited within the lined anode cup 12.

The cathode

According to the invention, the cathode 16 includes one or a mixture of bismuth compounds in which bismuth has an oxidation number of approximately three or more. The compound may consist, for example, of one or more substance selected from the group consisting of bismuth oxide ($Bi_2O_3$), bismuth tetroxide ($Bi_2O_4$), bismuth pentoxide ($Bi_2O_5$), bismuth oxychloride (BiOCl), bismuth oxybromide (BiOBr), bismuth oxyiodide (BiOI), bismuth iodate ($Bi(IO_3)_3$), nitrates of bismuth which are insoluble in the cell electrolyte (e. g. $xBi_2O_3yN_2O_5 \cdot 2H_2O$), bismuth molybdate ($Bi_2(MoO_4)_3$), bismuth sulfide ($Bi_2S_3$) and sodium bismuthate ($NaBiO_3$). For the purposes of this invention, bismuth oxide ($Bi_2O_3$) is the preferred cathode material because of its favorable theoretical capacity of 20.7 ampere-minutes per gram, and its insolubility and stability in a wide variety of electrolytes.

A suitable bismuth oxide cathode 16 is prepared by forming a dry mix of 10 parts of bismuth oxide and 1 part of acetylene black or graphite. To this dry mix is added a chromate compound which is slightly soluble in the cell electrolyte, for example barium chromate, in an amount approximately 3% by weight of the dry mix. The acetylene black is provided to impart the desired electrical conductivity to the bismuth electrode and may be added in other amounts to achieve the desired conductivity. The barium chromate is added to provide a reservoir of chromate ions to inhibit the corrosion of the magnesium anode. The powdered cathode mixture is moistened by a sufficient quantity of an electrolyte to bring the powder to a dough-like consistency suitable for molding a cathode bobbin of the desired shape.

The electrolyte

In general, a suitable electrolyte for use in a cell is determined by the material of the anode. The electrolyte should be ionically conductive and chemically compatible with the anode and the cathode and with the products of the electrode reactions. For use with a magnesium anode, the electrolyte may be selected from the halides of alkali and alkaline earth metals, for example, it may be an aqueous solution of magnesium bromide, strontium bromide, ammonium bromide, magnesium chloride or the like. The preferred electrolyte is magnesium bromide and one suitable solution comprises 250 grams of magnesium bromide per liter of water. However, wide latitude is permissable in the concentration of the magnesium bromide solution.

A small quantity of sodium dichromate or other soluble dichromate or chromate compound such as ammonium, lithium, potassium chromate or dichromate is added to the magnesium bromide solution to inhibit the corrosion of the magnesium. A wide range of concentrations of the soluble chromate or dichromate can be used depending upon the particular electrolyte and magnesium alloy selected. For the AZ31A magnesium base alloy and an electrolyte consisting of 250 grams of magnesium bromide per liter of water, a concentration of 0.2 gram of sodium dichromate per liter of electrolyte is satisfactory.

The cell

After the electrolyte has been added to the cathode mix, the cathode bobbin 16 is pressed into shape under pressure sufficient to insure adequate conductivity. A carbon rod 18 is inserted into the cathode bobbin to provide electrical connection thereto. The cell is sealed in any suitable manner, for example, by an insulating washer 20 mounted on the carbon rod and a layer of hard wax 22 on the washer and sealing the cup 12. A metal contact cap 24 of brass or the like is placed on rod 18. An air space 26 is provided between the washer 20 and the cathode 16.

In the preparation of the bismuth oxide cathode, the relative percentages of bismuth oxide and acetylene black or graphite are not critical and may be varied over a wide range, for example from less than one percent acetylene black to a mixture comprising one part of bismuth oxide to two parts of acetylene black by weight. The conductivity of the cell may be varied by thus changing the amounts of graphite and acetylene black. The particular proportions of these materials employed depends on the application for which the cell is intended.

In addition, the quantity of electrolyte mixed with the cathode powder is not critical, the method of handling and of formation of the cathode bobbin being the determining factor.

A bismuth oxide cathode has a theoretical capacity of 20.7 ampere-minutes per gram which is larger than other cathode materials presently employed in certain types of cells comparable to the cell described above. For example, manganese dioxide has a theoretical capacity of 18.5 and mercuric oxide has a theoretical capacity of 14.9 ampere-minutes per gram. The open-circuit voltage of a bismuth oxide-magnesium cell lies in the range of 1.50 to 1.70 volts.

Figures 2, 3 and 4 show the change in cell voltage with respect to discharge time of an "AA" Penlight size magnesium-bismuth oxide cell as compared with certain other existing types of cells. Referring to Figure 2, specifically, the curves show how the cell voltage varies with time on continuous high current drain through a four ohm load resistor (simulating the filament of a flashlight bulb) for a magnesium-bismuth oxide cell and the LeClanche and Mg—MnO₂ types of cells. It can be seen that the cell of the present invention maintains a high voltage level for a longer period of time than either of the other two cells.

Figure 3 and Figure 4 are similar to Figure 2 and show the cell voltage variation over a period of time for the aforementioned cells at continuous medium current drain through a 50 ohm and 150 ohm load resistor, respectively. These particular tests simulate portable radio applications.

The curves of Figure 5 show the hours of service to a 0.90 volt end point when various types of cells listed heretofore in Figures 2, 3 and 4 are discharged continuously at different current drains.

The reactions which are believed to occur at the cell electrodes in the magnesium-bismuth oxide cell are as follows:

ANODE REACTION $$Mg \rightarrow Mg^{++} + 2e^-$$

CATHODE REACTION $$Bi_2O_3 + 3H_2O + 6e^- \rightarrow 2Bi + 6OH^-$$

OVERALL CELL REACTION $$3Mg + Bi_2O_3 + 3H_2O \rightarrow 3Mg(OH)_2 + 2Bi$$

EXAMPLE II

As a modification of the invention, a cathode containing a bismuth compound of the type described above may be coupled with a zinc anode and an alkaline electrolyte. In this type of cell, a separator of polyvinyl alcohol, asbestos, or an alkali-resistant gel or paper is employed. The cathode mix 16 is made as described above except that the insoluble chromate is not added. The alkaline electrolyte employed in this cell may comprise an alkali hydroxide, for example, a solution of one or more of sodium, potassium, or lithium hydroxide. A preferred electrolyte is a 30% solution of sodium hydroxide saturated with zinc oxide.

Such a bismuth oxide-alkaline-zinc cell has an open circuit voltage in the range of 1.20 to 1.34 volts.

Te reactions which are believed to occur at the electrodes in a bismuth oxide-zinc cell containing an alkaline electrolyte are as follows:

ANODE REACTION $$Zn + 4OH^- \rightarrow ZnO_2 = + 2H_2O + 2E^-$$

CATHODE REACTION $$Bi_2O_3 + 3H_2O + 6E^- \rightarrow 2Bi + 6OH^-$$

OVERALL CELL REACTION $$3Zn + Bi_2O_3 + 6OH^- \rightarrow 3ZnO_2 = + 3H_2O + 2Bi$$

The bismuth oxide-zinc system may also be employed with an acid-type electroylte composed for example, of an aqueous solution of one or more of the halides (chloride, bromide or iodide) of the alkali and alkaline earth metals, the ammonium ion, zinc, and magnesium. Cells of this type have a somewhat lower voltage because of the lower electrode potential of zinc in these solutions. A mixture of ammonium chloride and zinc chloride provides a particuarly suitable acid electrolyte.

Magnesium and zinc have been described as preferred anode materials in the foregoing description of the invention, however, the anode material may comprise substantially any substance more electro-positive than hydrogen which provides a positive voltage when coupled with an oxygen containing compound of bismuth. For example, aluminum and manganese may be used as anode materials.

A cathode for a primary cell, according to the invention, may also comprise a bismuth-containing compound combined with other cathode materials such as manganese dioxide (MnO₂), mercuric oxide (HgO), silver oxide (Ag₂O), and copper oxide (CuO). Examples of the aforementioned electrochemical systems are listed below:

| Cathode | Electrolyte | Anode |
| --- | --- | --- |
| Bi₂O₃+MnO₂ | NH₄Cl—ZnCl₂ | Zn |
| Bi₂O₃+MnO₂ | NaOH or KOH | Zn |
| Bi₂O₃+MnO₂ | MgBr₂ | Mg |
| Bi₂O₃+HgO | NaOH or KOH | Zn |
| Bi₂O₃+CuO | NaOH or KOH | Zn |
| Bi₂O₃+Ag₂O | NaOH or KOH | Zn |

It is to be understood that the principles of the invention may be applied to cells of different shapes, sizes and general constructional details and to both wet and dry type cells and to reserve type cells.

What is claimed is:

1. A dry cell including an anode consisting essentially of a material selected from the group consisting of magnesium and magnesium-base alloys, an electrolyte, and a cathode consisting essentially of at least one substance selected from the group consisting of bismuth oxide, bismuth tetroxide, bismuth oxychloride, bismuth oxybromide, bismuth oxyiodide, bismuth iodate, sodium bismuthate, and nitrates of bismuth insoluble in said electrolyte.

2. A dry cell including an anode consisting essentially of a material selected from the group consisting of magnesium and magnesium-base alloys, an electrolyte, and a cathode consisting essentially of bismuth oxide.

3. A dry cell including an anode consisting essentially of a material selected from the group consisting of magnesium and magnesium-base alloys, an electrolyte, and a cathode consisting essentially of bismuth oxide and a substance for rendering said cathode electrically-conductive.

4. A dry cell including an anode consisting essentially of a material selected from the group consisting of magnesium and magnesium-base alloys, an electrolyte, and a cathode consisting essentially of bismuth oxide and carbon black.

5. A dry cell including an anode consisting essentially of a material selected from the group consisting of magnesium and magnesium base alloys, an electrolyte, and a cathode consisting essentially of bismuth oxide and a carbon material for rendering said cathode electrically-conductive, the bismuth oxide and the carbon material being present within a range of one part bismuth oxide to a fraction of a part of carbon material and one part bismuth oxide to about two parts of carbon material.

6. A dry cell including an anode consisting essentially of magnesium, an electrolyte, and a cathode consisting essentially of bismuth oxide.

7. A dry cell including an anode consisting essentially of magnesium, an aqueous magnesium bromide electrolyte and a cathode consisting essentially of bismuth oxide.

References Cited in the file of this patent

UNITED STATES PATENTS

| | | |
|---|---|---|
| 946,540 | Edison | Jan. 18, 1910 |
| 999,762 | Edison | Aug. 8, 1911 |
| 1,034,002 | Edison | July 30, 1912 |
| 1,036,471 | Edison | Aug. 20, 1912 |
| 1,195,677 | Heil | Aug. 22, 1916 |
| 2,612,533 | Blake | Sept. 30, 1952 |
| 2,616,940 | Reid | Nov. 4, 1952 |